US011824752B2

United States Patent
Prohofsky

(10) Patent No.: US 11,824,752 B2
(45) Date of Patent: *Nov. 21, 2023

(54) PORT-TO-PORT NETWORK ROUTING USING A STORAGE DEVICE

(71) Applicant: Seagate Technology LLC, Fremont, CA (US)

(72) Inventor: Thomas Roy Prohofsky, Edina, MN (US)

(73) Assignee: Seagate Technology LLC, Fremont, CA (US)

( * ) Notice: Subject to any disclaimer, the term of this patent is extended or adjusted under 35 U.S.C. 154(b) by 27 days.

This patent is subject to a terminal disclaimer.

(21) Appl. No.: 17/548,067

(22) Filed: Dec. 10, 2021

(65) Prior Publication Data

US 2022/0103450 A1 Mar. 31, 2022

Related U.S. Application Data

(63) Continuation of application No. 16/724,602, filed on Dec. 23, 2019, now Pat. No. 11,218,396.

(51) Int. Cl.
*G06F 3/06* (2006.01)
*H04L 43/0888* (2022.01)
(Continued)

(52) U.S. Cl.
CPC .......... *H04L 43/0888* (2013.01); *G06F 3/067* (2013.01); *G06F 13/28* (2013.01);
(Continued)

(58) Field of Classification Search
None
See application file for complete search history.

(56) References Cited

U.S. PATENT DOCUMENTS 6,067,595 A 5/2000 Lindenstruth
6,308,218 B1 10/2001 Vasa
(Continued)

FOREIGN PATENT DOCUMENTS

CN 1279785 1/2001
CN 103180816 6/2013
(Continued)

OTHER PUBLICATIONS

One Stop Systems, "PCIe over Cable", http://www.networkallies.com/downloads/partners/one-stop- systems/OSS_PCIe_networking.pdf, printed from internet on Dec. 22, 2019, 2 pages.
(Continued)

*Primary Examiner* — Michael Sun
(74) *Attorney, Agent, or Firm* — Mueting Raasch Group

(57) ABSTRACT

A multi-port data storage device to at least provide port-to-port communication between nodes. The multi-port storage device includes a first port, a second port and a bridge. The first port can be operatively coupled to a first node of a plurality of nodes. The second port can be operatively coupled to a second node of the plurality of nodes. The bridge can receive one or more data packets via the first or second ports to be transmitted to one of the plurality of nodes and to transmit one or more received data packets to another multi-port data storage device, to the first node, or to the second node.

20 Claims, 7 Drawing Sheets

(51) Int. Cl.
*H04L 67/1097* (2022.01)
*G06F 13/40* (2006.01)
*G06F 13/42* (2006.01)
*G06F 13/28* (2006.01)
*H04L 45/00* (2022.01)

(52) U.S. Cl.
CPC .......... *G06F 13/4004* (2013.01); *G06F 13/42* (2013.01); *H04L 45/66* (2013.01); *H04L 67/1097* (2013.01)

(56) References Cited

U.S. PATENT DOCUMENTS

| | | | |
|---|---|---|---|
| 6,363,067 B1 | 3/2002 | Chung | |
| 7,606,245 B2 * | 10/2009 | Ma | H04L 45/00 370/352 |
| 7,698,396 B2 * | 4/2010 | Aoyagi | H04L 12/462 709/224 |
| 7,860,015 B1 | 12/2010 | Panelli et al. | |
| 7,913,022 B1 | 3/2011 | Baxter | |
| 7,986,629 B1 | 7/2011 | Ferguson et al. | |
| 8,218,538 B1 * | 7/2012 | Chidambaram | H04L 49/9094 370/386 |
| 8,595,406 B2 | 11/2013 | Lin et al. | |
| 8,713,295 B2 | 4/2014 | Bax et al. | |
| 10,075,524 B1 | 9/2018 | Bshara et al. | |
| 10,162,793 B1 | 12/2018 | Bshara et al. | |
| 10,452,316 B2 | 10/2019 | Lomelino et al. | |
| 10,713,202 B2 | 7/2020 | Park et al. | |
| 10,963,394 B2 | 3/2021 | Kachare et al. | |
| 11,522,817 B1 * | 12/2022 | Matthews | H04L 43/0882 |
| 2010/0316062 A1 | 12/2010 | Manzella | |
| 2011/0072243 A1 * | 3/2011 | Qiu | G06F 9/3887 712/216 |
| 2016/0011965 A1 * | 1/2016 | Murphy | G06F 12/0868 711/103 |
| 2017/0344506 A1 * | 11/2017 | Park | G06F 13/4022 |
| 2018/0260125 A1 * | 9/2018 | Botes | G06F 3/065 |

FOREIGN PATENT DOCUMENTS

| | | |
|---|---|---|
| CN | 107436855 | 12/2017 |
| CN | 110389909 | 10/2019 |

OTHER PUBLICATIONS

One Stop Solutions, "PCIe over Cable Goes Mainstream", https://www.onestopsystems.com/blog-post/pcie-over-cable-goes-mainstream, printed from internet Dec. 22, 2019, 10 pages.

* cited by examiner

PORT-TO-PORT NETWORK ROUTING USING A STORAGE DEVICE

RELATED APPLICATIONS

This application is as continuation of U.S. application Ser. No. 16/724,602 filed on Dec. 23, 2019, which is incorporated herein by reference in its entirety.

The present disclosure relates to network routing. In particular, the present disclosure relates to port-to-port network routing and dataflow using a storage device.

SUMMARY

Various embodiments of the present disclosure relate to port-to-port networking using data storage devices. A data storage device may provide a link between nodes. The data storage device may receive a data packet and transmit the received data packet to one of the nodes of another data storage device providing a link to one of the nodes.

In at least one embodiment, an exemplary multi-port data storage device may include a first port, a second port and a bridge. The first port may be operatively coupled to a first node of a plurality of nodes. The second port may be operatively coupled to a second node of the plurality of nodes. The bridge may be configured to receive one or more data packets via the first or second ports to be transmitted to one of the plurality of nodes and to transmit one or more received data packets to another multi-port data storage device, to the first node, or to the second node.

In at least one embodiment, an exemplary port-to-port network routing system may include a plurality of nodes and a plurality of multi-port data storage devices. The plurality of nodes may be configured to at least receive, transmit, and store data. Each of the plurality of nodes may include a memory and a data bus operatively coupled to the memory. The plurality of multi-port data storage devices may be configured to at least provide port-to-port communication between nodes. Each of the plurality of multi-port storage devices may include a first port, a second port, and a bridge. The first port may be operatively coupled to the data bus of a first node of a plurality of nodes. The second port may be operatively coupled to the data bus of a second node of the plurality of nodes. The bridge may be configured to receive one or more data packets via the first or second ports to be transmitted to one of the plurality of nodes and to transmit one or more received data packets to another multi-port data storage device, to the first node, or to the second node.

In at least one embodiment, an exemplary method can include receiving a data packet via a first port of a multi-port data storage device using a bridge of the multi-port data storage device; and transmitting the data packet via a second port of the multi-port data storage device using the buffer to one of another multi-port data storage device, to a first node operatively coupled to the multi-port data storage device, or to a second node operatively coupled to the multi-port data storage device.

The above summary is not intended to describe each embodiment or every implementation of the present disclosure. A more complete understanding will become apparent and appreciated by referring to the following detailed description and claims taken in conjunction with the accompanying drawings. In other words, these and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1:
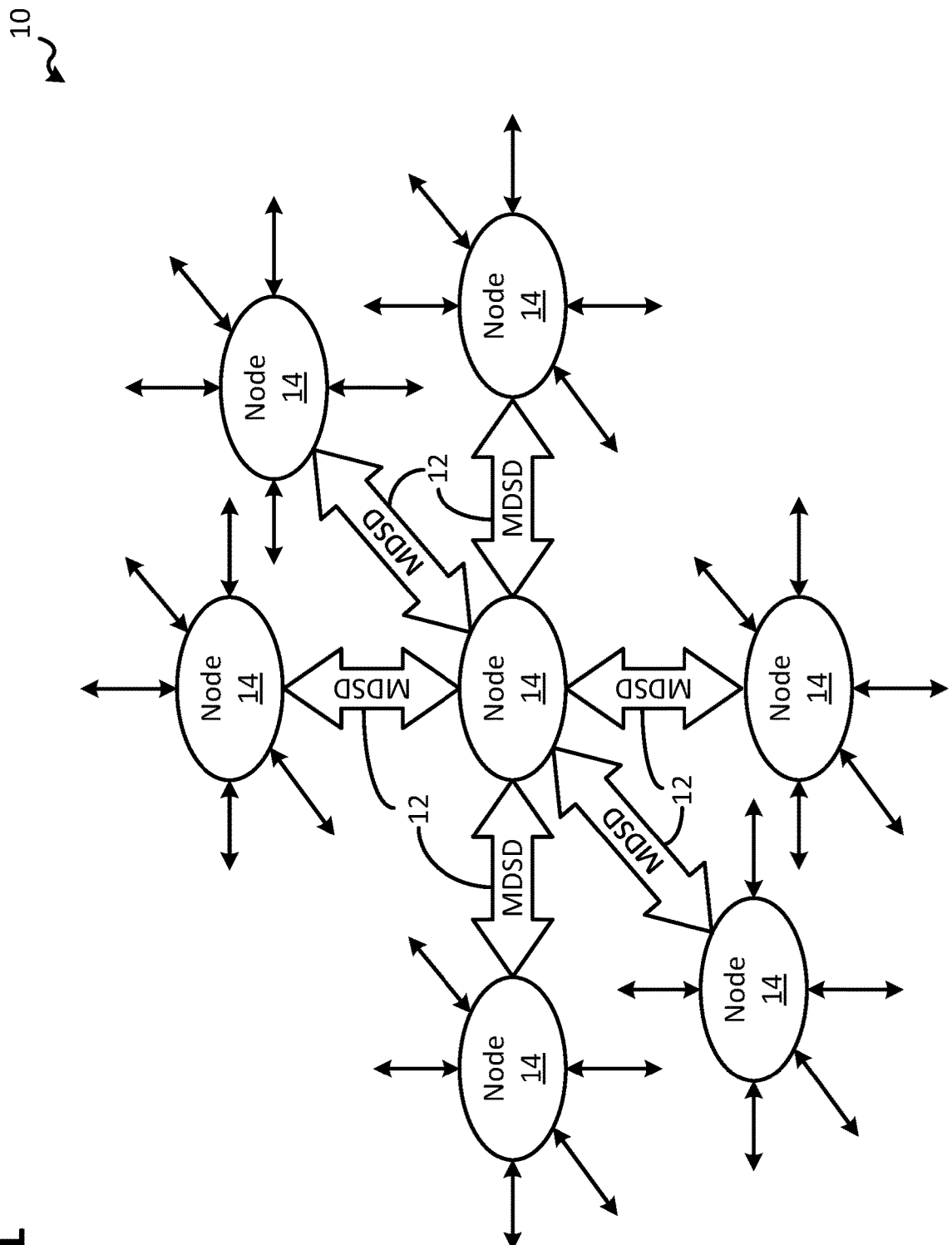
FIG. 1 is a schematic diagram of an example network using multi-port data storage devices as links between nodes.

The present disclosure relates to systems, methods, and processes for port-to-port network routing using data storage devices, such as multi-port data storage devices. Although reference is made herein to nodes, devices, and storage devices, data may be stored in any suitable data storage system with available storage space that stores data on different devices or nodes. Non-limiting examples of data storage devices include non-volatile and volatile memory, hard disk drives, solid state drives, and multilayer drives (for example, utilizing both hard disk and solid state). Various other applications will become apparent to one of skill in the art having the benefit of the present disclosure.

Moving data through a network can be expensive. Data storage devices such as solid-state drives (SSD) may be in an operating mode where the host interconnections are underutilized due to low queue depth, mixed reads and writes, or small transfer sizes. A virtual network function may be instantiated in the data storage device such that network traffic could pass through from one port of the data storage device to another. A mesh or other network topology could be created using the data storage devices to link compute complexes or nodes without the cost or power consumption of a network adapter and switch.

Current data bus architectures such as peripheral component interconnect express (PCIe) support virtual functions. Instantiating a virtual network function in a data storage device may allow one hardware connection to present multiple virtual devices to the operating system. By configuring each port of a multi-port data storage device (MDSD) to present one or more network functions, the MDSD can read/write data locally stored within the device and pass network traffic through to the other ports to the limits of data bus rate. A collection of compute complexes or nodes in a multidimensional mesh topology can provide cost reductions and increased throughput. In one example, each node has 6 PCIe by 4 lane busses then a 3-dimensional mesh can be configured with MDSDs providing connections to 6 adjacent servers. Each MDSD drive may be a dual-port dual-lane drive that provide 2 GB/s simplex and 4 GB/s duplex for each link. Six links enable 24 GB/s per node using PCIe Gen 3. PCIe Gen4×4 may provide 96 GB/s per node. This amount of traffic may not be bridged by a store and forward operation by the node central processing unit (CPU).

The MDSD may write data packets directly (e.g., direct memory access) via each port to the next MDSD in the path of communication between the source and destination nodes. Direct memory access is a feature of computer systems that allows certain hardware subsystems to access memory independent of the central processing unit (CPU). In other words, the MDSD may write data packets to other devices or MDSDs without using CPUs or memory of operably coupled nodes. The MDSD may include a bridge configured to carry out the operations described herein. Although the bridge may be described as carrying out the operations described herein, the MDSD may include a processor or controller to carry out the operation of the bridge. The bridge may include a buffer to provide store and forward functionality.

The topology of the network may be discovered at initialization so that node and link connections are known to operably coupled nodes of the network. Then the source node's network driver may select one or more paths to the destination for each data packet or datagram. The one or more paths or route guidance may be appended to the data packet and written to a bridge. This bridge may be in host memory. A notification may be sent to the MDSD to read/transmit or it could be written directly into a pre allocated bridge in the drive. Route guidance may be offered in vectors (e.g., east-2, west-1, up-1). Accordingly, all of the base address registers for all the nodes (e.g., servers) may not have to be shared to all nodes. Instead, the egress port of the MDSD may know the memory location for vectors of its node. When the egress port pushes the data packet to the MDSD at such vector, it may decrement that vector. Thus. a method for changing the route due to dataflow backpressure or server failure may be enabled.

Data packets can be cut through the drive to avoid store and forward latency. Cut through logic may start issuing the data on the egress port prior to reception of the full data packet. To enable recovery mechanisms a footer may be appended to the data which includes a good/bad transmission indication along with other possible data like timestamps and sequence numbers.

Data packet route selection at each link or node may be based on egress ID (EID) congestion or bandwidth utilization. Routing methods may include and suitable process or method such as, e.g., a round robin selection of possible paths, an egress option or options stored in a race header of the data packet at data packet generation, least used EID selection, etc.

FIG. 1 shows a schematic diagram of a network 10 for using multi-port data storage devices (MDSD) 12 as links between nodes 14. In other words, network 10 may be a port-to-port network routing system.

Each of the nodes 14 of the network 10 is linked to at least one other node 14 using a MDSD 12. Each MDSD 12 may include at least two ports. A first port may be operably coupled to a first node and a second port may be coupled to a second node of the nodes 14. In some embodiments, one or more of the MDSDs 12 may include more than two ports. Each port of the MDSDs 12 may be operatively coupled to a different node 14. Accordingly, the nodes 14 may be linked by the MDSDs 12 into any suitable network topology such as, e.g., ring, mesh, star, fully connected, Dragonfly, Slimfly, Toroid, etc. In at least one embodiment, the network 10 is arranged in a Slimfly topology.

Figure 2:
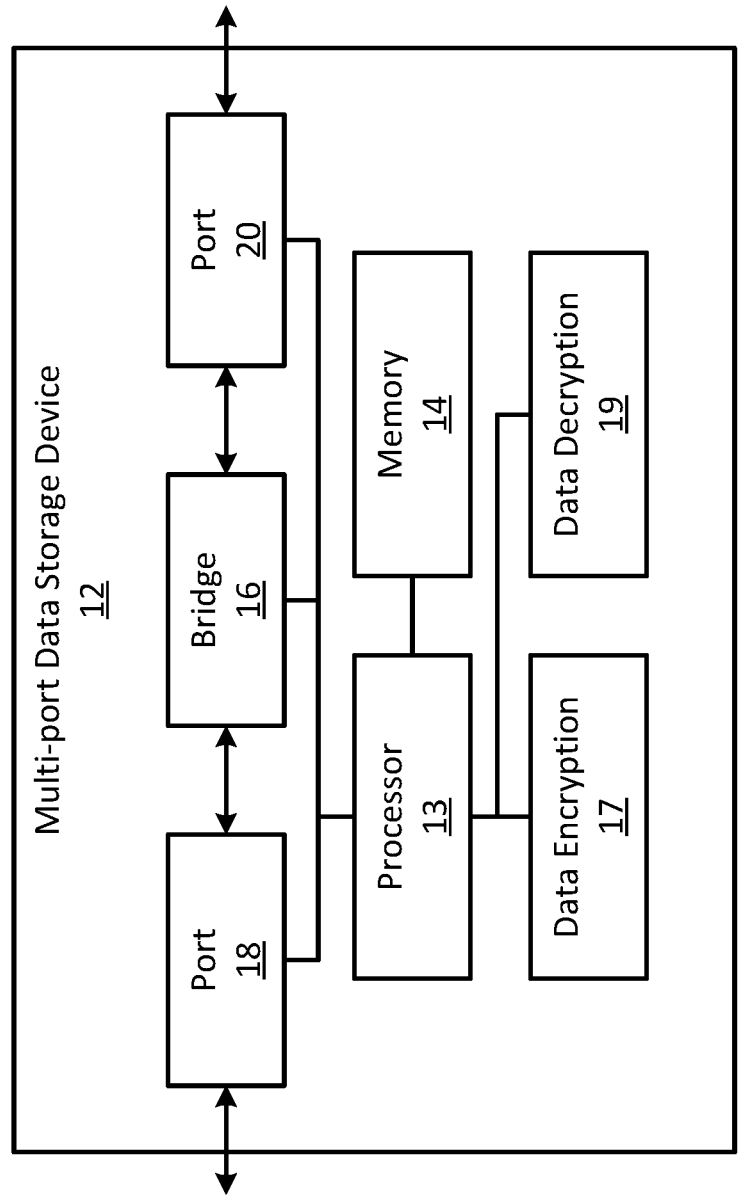
FIG. 2 is a schematic block diagram of an example multi-port data storage device for operations in accordance with embodiments of the present disclosure.

FIG. 2 is a schematic block diagram of an example multi-port data storage device (MDSD) 12 for a network in accordance with embodiments of the present disclosure similar to as shown in FIG. 1. The MDSD 12 may include a bridge 16 and ports 18 and 20. The MDSD 12 may include any suitable device such as, e.g., a solid-state storage device (SSD), a non-volatile memory express (NVMe) device, etc. The MDSD 12 may include a data encryption engine 17 and decryption engine 19. The MDSD 12 may further include a processor 13 and a memory 14. The processor 13 may execute operations of the MDSD 12 as described in various embodiments herein.

Ports 18 and 20 may each be operatively coupled to a different node of a network such as, e.g., network 10 of FIG. 1. Such an arrangement allows MDSD 12 to transmit and receive data packets via ports 18 and 20. Ports 18 and 20 may include any suitable connector for operatively coupling to a data bus such as, e.g., SATA, PCIe, M.2, U.2, mSATA, SATA Express, etc. In at least one embodiment, each of ports 18 and 20 include a PCIe connector. The two ports 18 and 20 may include an input output (io) bus. Although shown with only two ports 18 and 20, MDSDs such as the MDSD 12 may include more than two ports such as, e.g., 3 ports, 4 ports, etc. Each port of the MDSD 12 may be operatively coupled to a different node.

The bridge 16 may receive data packets via each of ports 18 and 20. The bridge 16 may be configured by a virtual network function. The bridge 16 may be configured to transmit received data packets to any operatively coupled node or to any MDSD operatively coupled to such nodes. For example, the bridge 16 may receive a data packet from a first node via port 18. The bridge 16 may transmit the received data packet to a second node or a MDSD operatively coupled to the second node via port 20. The bridge 16 may be configured to receive data packets via direct memory access. Additionally, the bridge 16 may be configured to transmit data packets via direct memory access. Such a configuration allows cut through logic that may eliminate store and forward latency. Furthermore, the bridge 16 may be configured to receive and transmit data packets without using processors of operably coupled nodes. In other words, the bridge 16 may not need an external processor to execute network functions.

In one embodiment, the bridge 16 receives one or more data packets via port 18 or port 20 to be transmitted to one of a plurality of nodes and to transmit one or more received data packets to another MDSD, to a node via port 18, or to a node via port 20. The bridge 16 may be configured to transmit one or more received data packets to another MDSD, to a node via port 18, or to a node via port 20 based on a destination address of each of the received data packets. The bridge 16 may be configured to decrement a passthru limit of the received one or more data packets. The bridge 16 may be configured to prohibit transmission of packets received with a passthru limit of 0.

The bridge 16 may include a buffer. The buffer may be configured to receive a data data packet for transmission. The buffer may provide store and forward capabilities. The buffer may be any suitable buffer such as, for example, a ring buffer, a first in first out buffer, a queue, etc. In at least one embodiment, the buffer is a ring buffer.

In at least one embodiment, the data encryption engine 17 may transform data of a payload portion of the data packet such that transmission via port 20 is encrypted. The data of the payload may be encrypted using any suitable encryption method such as, for example, the Advanced Encryption Standard (AES) using the source node's private key and destination nodes public key. In at least one embodiment, the data decryption engine 19 may transform the data of the payload portion of the data packet so transmission via port 20 is the original data payload issued by the sending node. One example of decryption method would be embodiment of the Advanced Encryption Standard (AES) using the source node's public key and destination nodes private key.

Figure 3:
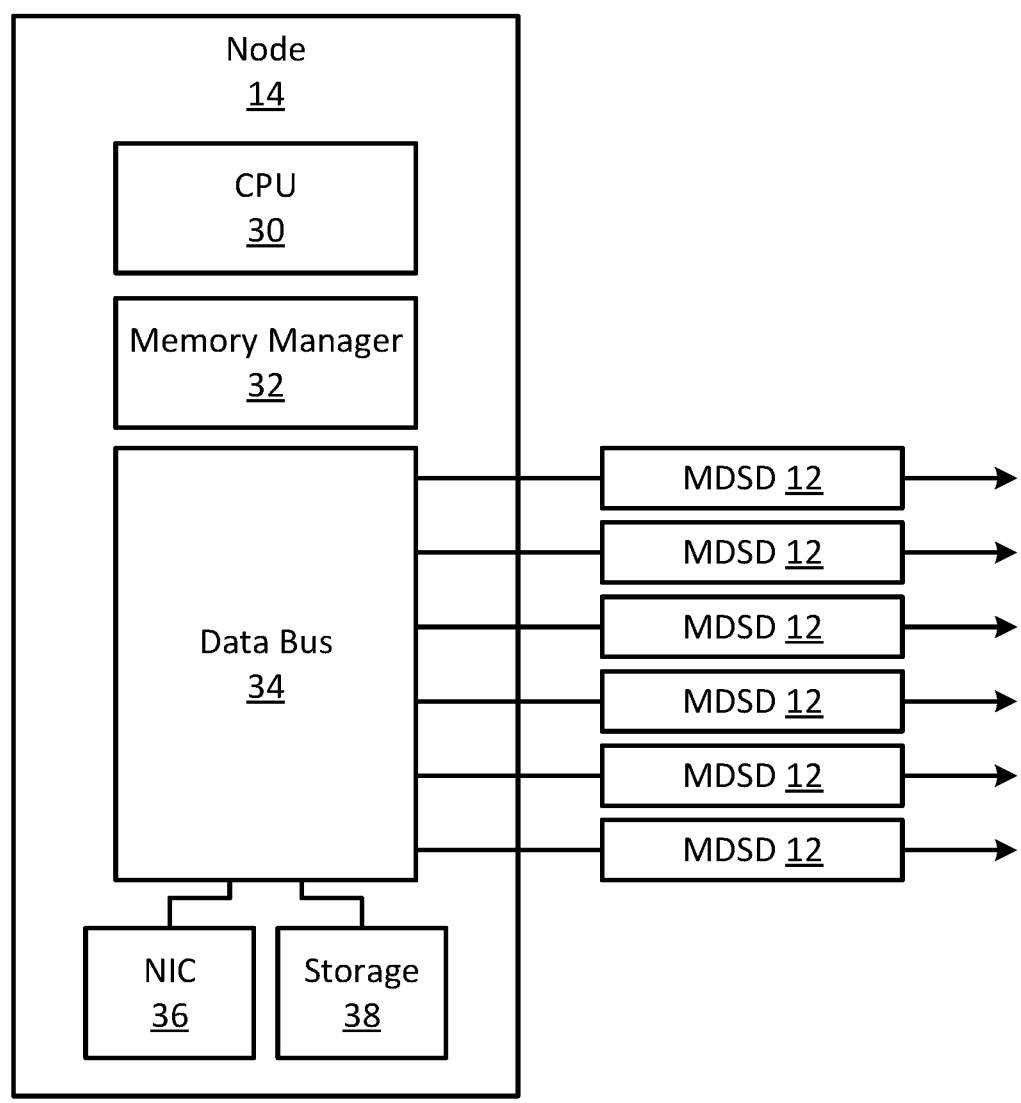
FIG. 3 is a schematic block diagram of an example node for operations in accordance with embodiments of the present disclosure.

FIG. 3 is a block diagram of an example node 14 for a network in accordance with embodiments of the present disclosure. The node 14 may include a central processing unit (CPU) 30, a memory manager 32, a data bus 34, a network interface controller (NIC) 36, and data storage devices 38. The node 14 may include any suitable computing apparatus such as, e.g., a personal computer, a compute complex, a server, etc.

The CPU 30 may include one or more processors, controllers, memories, caches, PCIe Bridges, other data busses, etc. The CPU 30 may be operatively coupled to the data bus 34. The CPU 30 may be configured to generate data packets, use the MDSDs 12 to discover other nodes, process interrupts, and manage MDSD data bridging exceptions and faults. The memory manager 32 may include any hardware or software suitable to dynamically allocate portions of memory for program execution and enumeration of MDSDs within an address space of the CPUs 30.

The data bus 34 may include any suitable bus apparatus and protocol such as, e.g., a PCIe bus, a HyperTransport bus, an InfiniBand bus, Compute Express Link, or other suitable bus for operatively coupling data storage devices. In at least one example, the data bus 34 is a PCIe bus. The data bus 34 may be operably coupled to data storage devices or other peripheral computer components.

The NIC 36 may be operably coupled to the data bus 34. Additionally, the NIC 36 may be operably coupled to an external network. The NIC 36 may include any suitable apparatus to transmit and receive data packets such as, e.g., a memory, processor, etc. The NIC 36 may allow the node 14 to communicate with networks external to a port-to-port network using storage devices. The NIC 36 may be operably coupled to any suitable communication medium such as, e.g., an ethernet cable.

The data storage devices 38 may be operably coupled to the data bus 34. The data storage devices 38 may include any suitable storage device or apparatus such as, e.g., SDDs, NVMe devices, random access memory (RAM), hard disc drives (HDDs), Serially Attached Small Computer System Interface (SAS) host bus adapters, etc. The data storage devices 38 may store data, programs, databases, data objects, data replicas, file systems, point in time snapshots, etc.

The node 14 may be operably coupled to MDSDs 12. The node 14 may be operably coupled to the MDSDs 12 via the data bus 34. As such, the node 14 can transmit data packets to other nodes via the MDSDs 12. This allows the node 14 to utilize the bandwidth and speed of the data bus 34 and the MDSDs 12. The node 14 may be configured to transmit data packets to the MDSDs 12 using direct memory access.

Figure 4:
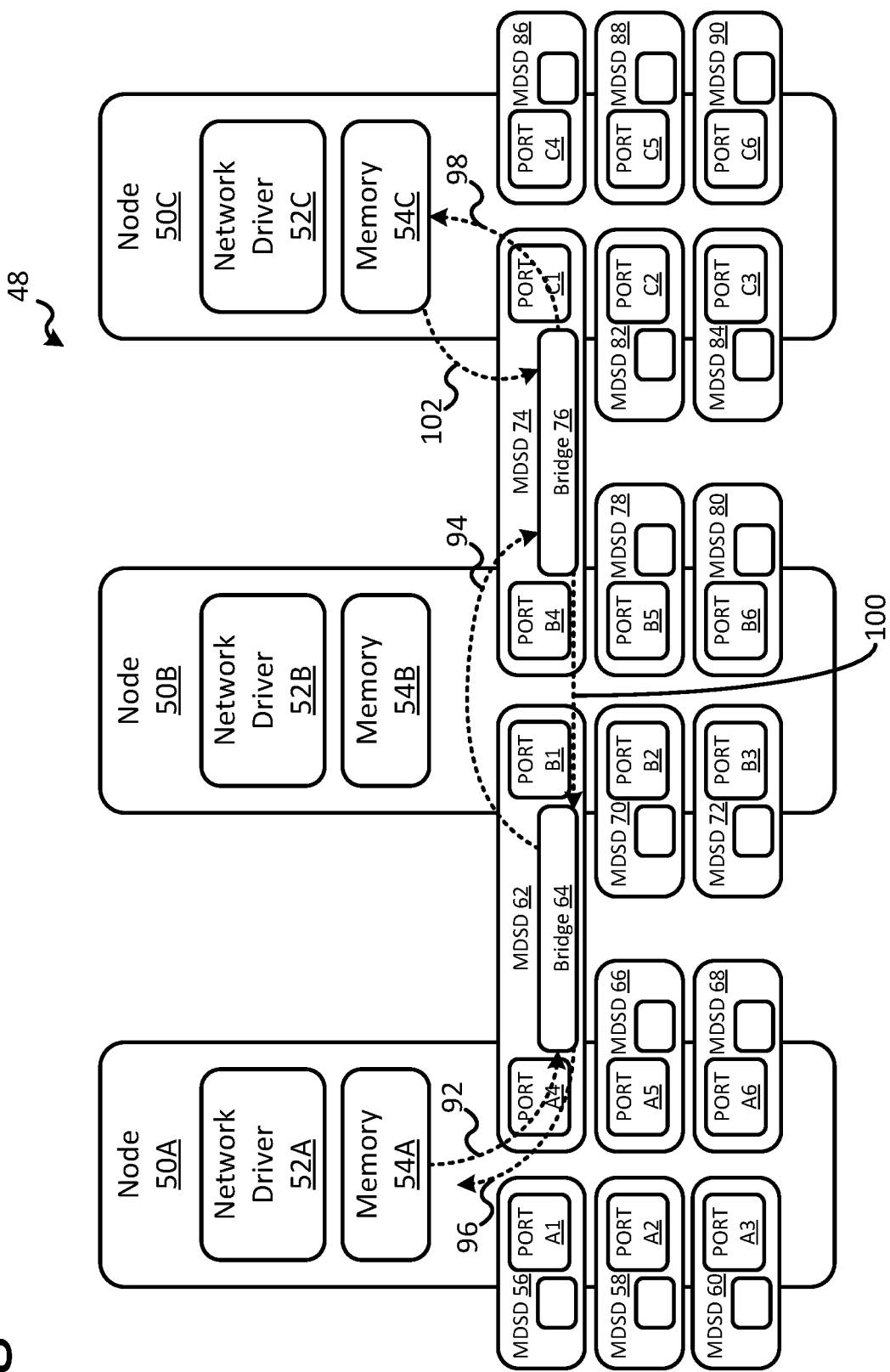
FIG. 4 is a schematic block diagram of an example of network routing operations in accordance with embodiments of the present disclosure.

FIG. 4 is a schematic diagram of an example of a network 48 and network routing operations in accordance with embodiments of the present disclosure. The network 48 may include nodes 50A-50C and MDSDs 56, 58, 60, 62, 66, 68, 70, 72, 74, 78, 80, 82, 84, 86, 88, and 90. Nodes 50A-50C may each include the configurations and apparatus of nodes 14 of FIGS. 1 and 3. MDSDs 56, 58, 60, 62, 66, 68, 70, 72, 74, 78, 80, 82, 84, 86, 88, and 90 may each include the configurations and apparatus of MDSD 12 of FIGS. 1-3.

Node 50A may include network driver 52A and a memory 54A. Node 50A may be operatively coupled to MDSD 56 via port A1, MDSD 58 via port A2, MDSD 60 via port A3, MDSD 62 via port A4, MDSD 66 via port A5, and MDSD 68 via port A6. Each of MDSDs 56, 58, 60, 66, and 68 may be operatively coupled to another node (not shown). MDSD 62 is operatively coupled to node 50A via port A4 and node 50B via port B1.

Node 50B may include network driver 52B and a memory 54B. Node 50B may be operatively coupled to MDSD 62 via port B1, MDSD 70 via port B2, MDSD 72 via port B3, MDSD 74 via port B4, MDSD 78 via port B5, and MDSD 80 via port B6. Each of MDSDs 70, 72, 78, and 80 may be operatively coupled to another node (not shown). MDSD 74 is operatively coupled to node 50B via port B4 and node 50C via port C1.

Node 50C may include network driver 52C and a memory 54C. Node 50C may be operatively coupled to MDSD 74 via port C1, MDSD 82 via port C2, MDSD 84 via port C3, MDSD 86 via port C4, MDSD 88 via port C5, and MDSD 90 via port C6. Each of MDSDs 82, 84, 86, 88, and 90 may be operatively coupled to another node (not shown).

Network drivers 52A-52C may be configured to generate data packets for port-to-port networks such as network 48. Network drivers 52A-52C may include a network map including the nodes of the network and their associated links (e.g., MDSDs 56, 58, 60, 62, 66, 68, 70, 72, 74, 78, 80, 82, 84, 86, 88, 90, etc.) to one another.

At step 92, the network driver 52A may write one or more data packets into bridge 64 of MDSD 62. The network driver 52A may write the one or more data packets into bridge 64 using direct memory access. The network driver 52A may write a send request to MDSD 62 with the location in memory of the data packet for the MDSD 62 to fetch. The bridge 64 may encrypt the fetched data packet. The network driver 52A may select the MDSD 62 based on a destination address of the one or more data packets.

At step 94, bridge 64 transmits the one or more data packets by writing into bridge 76 of the MDSD 74. The bridge 64 may write the one or more data packets into bridge 76 using direct memory access. The bridge 64 may select the bridge 76 based on the destination address of each of the one or more data packets. At step 96, the bridge 64 may notify the network driver 52A that the transmission of the one or more data packets via the MDSD 62 is complete.

At step 98, the bridge 76 writes one or more data packets into the memory 54C. The bridge 76 may write the one or more data packets into the memory 54C using direct memory access. The bridge 76 may select the memory 54C based on the destination address of each of the one or more data packets. The bridge 76 may decrypt the data packet. At step 100, the bridge 76 may notify bridge 64 that the transmission of the one or more data packets via MDSD 74 is complete. At step 102, the network driver 52C may notify the bridge 76 of complete reception of the one or more data packets.

Figure 5:
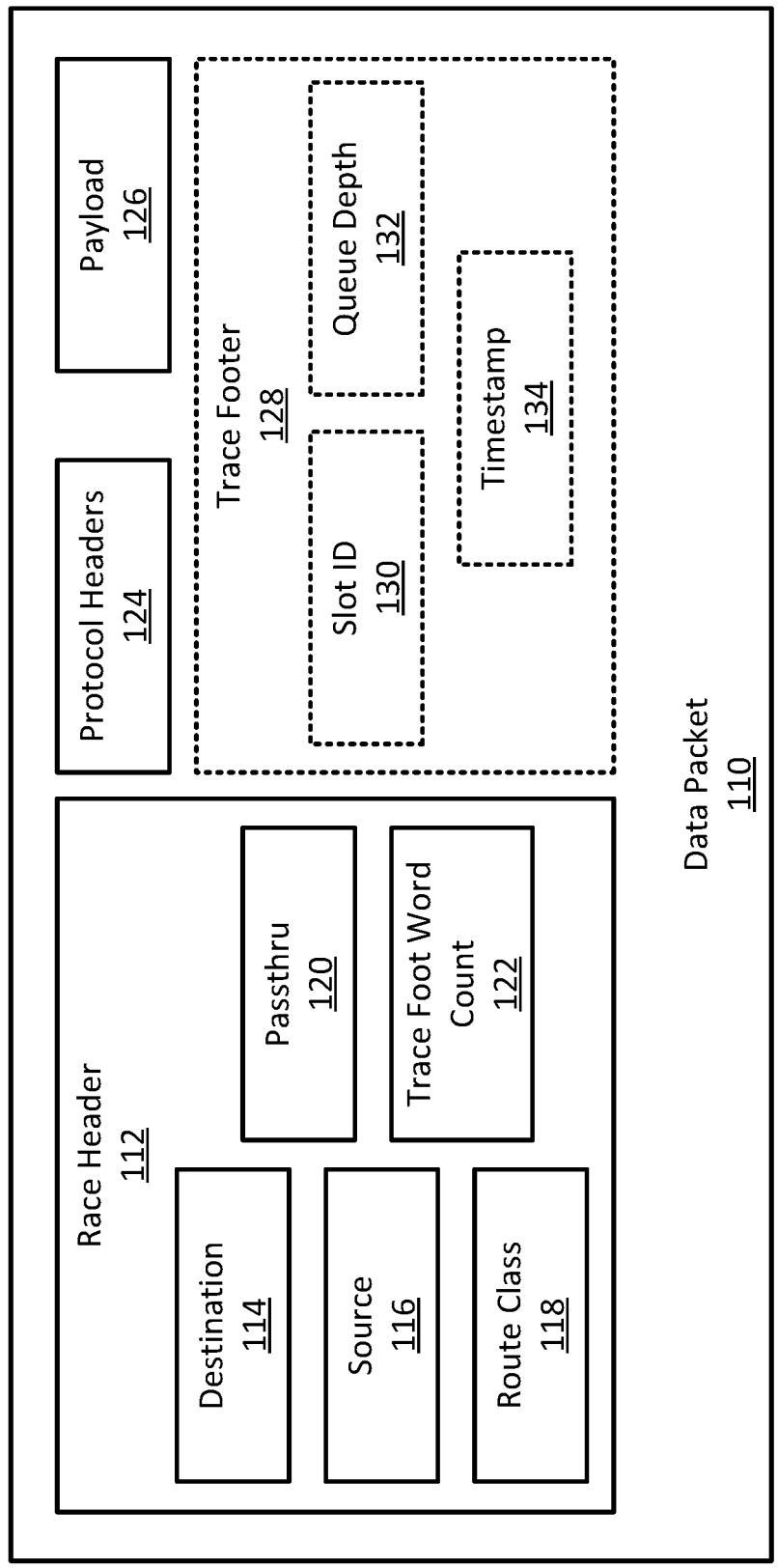
FIG. 5 is a schematic block diagram of an example data packet in accordance with embodiments of the present disclosure.

FIG. 5 is a schematic block diagram of an example data packet 110 in accordance with embodiments of the present disclosure. The data packet 110 may include a race header 112, protocol headers 124, and a payload 126. The data packet 110 may optionally include a trace footer 128.

The race header 112 may include information for port-to-port network routing. The race header 112 may include a destination address 114, a source address 116, a route class 118, a passthru counter 120, and a trace footer word count 122.

The destination address 114 may include any suitable identifier of the intended destination of the data packet 110. In other words, the destination address 114 identifies the node or other device intended to ultimately receive the data packet 110. Suitable identifiers may include the media access control (MAC) address, a physical address, an internet protocol address, host unique identifier, application unique identifier, etc. In at least one example, the destination address 114 includes the MAC address of the intended destination of the data packet 110.

The source address 116 may include any suitable identifier of the source of the data packet 110. In other words, the source address 116 identifies the node or other device that generated the data packet 110. Suitable identifiers may include the media access control (MAC) address, a physical address, an internet protocol address, host unique identifier, application unique identifier, etc. In at least one example, the source address 116 includes the MAC address of the source of the data packet 110.

The route class 118 may include an indicator of a priority level of the data packet 110. Data packets with a higher priority level or route class may be pushed or transmitted through routes with fewer hops regardless of congestion along such routes. In contrast, data packets with a lower priority level or route class may be pushed or transmitted through routes with higher hop counts to avoid congested or heavily used routes. Data packets of higher priority may be transmitted ahead of prior received packets of lower priority.

The passthru counter 120 may include a maximum number of hops or links (e.g., MDSDs 12 of FIGS. 1-3) that the data packet 110 is permitted to pass through. The passthru counter 120 may be decremented each time the data packet 110 is received by a MDSD of a port-to-port network. The MDSD may prohibit transmission the data packet 110 if the passthru counter 120 is at zero prior to being decremented and the destination address 114 is not for an operatively coupled node. The MDSD may send or transmit a notification to the source address 116 when the data packet 110 is prohibited.

The trace foot word count 122 may record the number of hops or links (e.g., MDSDs 12 of FIGS. 1-3) that the data packet 110 has passed through. The trace foot word count 122 may further include an indication of which MDSDs the data packet 110 has passed through.

The protocol headers 124 may include information for proper external network routing. The protocol headers 124 may include any suitable network headers such as, e.g., Internet Protocol (IP) headers, User Datagram Protocol (UDP) headers, Transmission Control Protocol (TCP) headers, Transactional Transmission Control Protocol (T/TCP) headers, etc.

The payload 126 may be the data to be transmitted to a node or other location. The payload 126 may not altered once the data packet 110 is generated. The data packet 110 may include a checksum to verify the integrity of the payload 126 upon delivery of the data packet 110 to the intended destination.

The trace footer 128 may include slot identification (ID) 130, queue depth 132, and a timestamp 134. The slot ID 130 may include an indication of the location of the intended destination of the data packet 110 within the port-to-port network (e.g., network 10 of FIG. 1). The slot ID 130 may be determined based on the destination address 114. The slot ID 130 may further be determined based on a comparison of the destination address 114 and a list of MAC addresses mapped to slot IDs of the port-to-port network. The slot ID 130 may also include an MDSD identifier, propagation time through the MDSD, bridge utilization, historical throughput metrics, route congestion, etc.

The queue depth 132 may include an indication of the maximum queue depth per class or route class. The time stamp 134 may indicate when the data packet 110 was generated or created. The time stamp 134 may be used to determine a transmission time of the data packet 110. The time stamp 134 may be used to determine an age of the data packet 110 during transmission.

Figure 6:
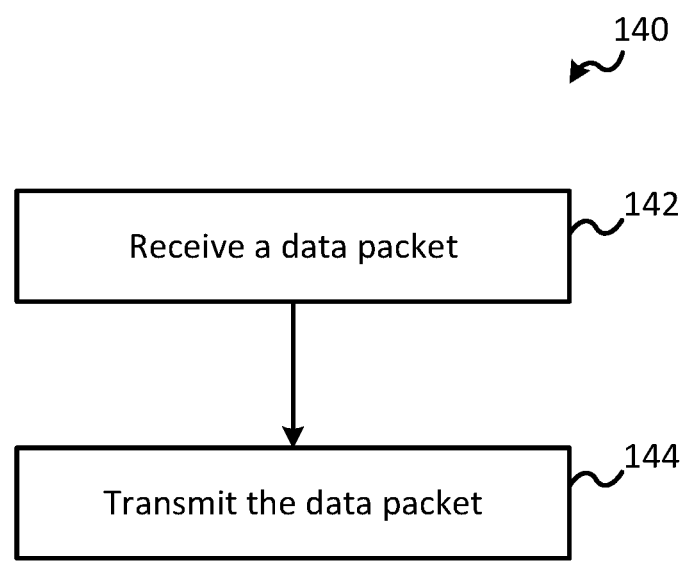
FIG. 6 is a flowchart of an example method in accordance with embodiments of the present disclosure.

FIG. 6 is a flowchart of an example method 140 in accordance with embodiments of the present disclosure. The method 140 can include receiving a data packet via a first port of a multi-port data storage device using a bridge of the multi-port data storage device 142. The data packet can be received from a node or another multi-port data storage device. The data packet can be received via direct memory access.

The method 140 can include transmitting the data packet via a second port of the multi-port data storage device using the bridge to one of another multi-port data storage device, to a first node operatively coupled to the multi-port data storage device, or to a second node operatively coupled to the multi-port data storage device 144. The data packet can be transmitted using direct memory access. The data packet can be transmitted without using processors of the first and second nodes. The data packet can be transmitted to one of another multi-port data storage device, to the first node, or to the second node based on a destination address of the packet. Transmitting the data packet may further comprise selecting the one of another multi-port data storage device based on egress ID (EID) congestion or bandwidth utilization and transmitting the one or more packets to the selected one of another multi-port data storage device.

Figure 7:
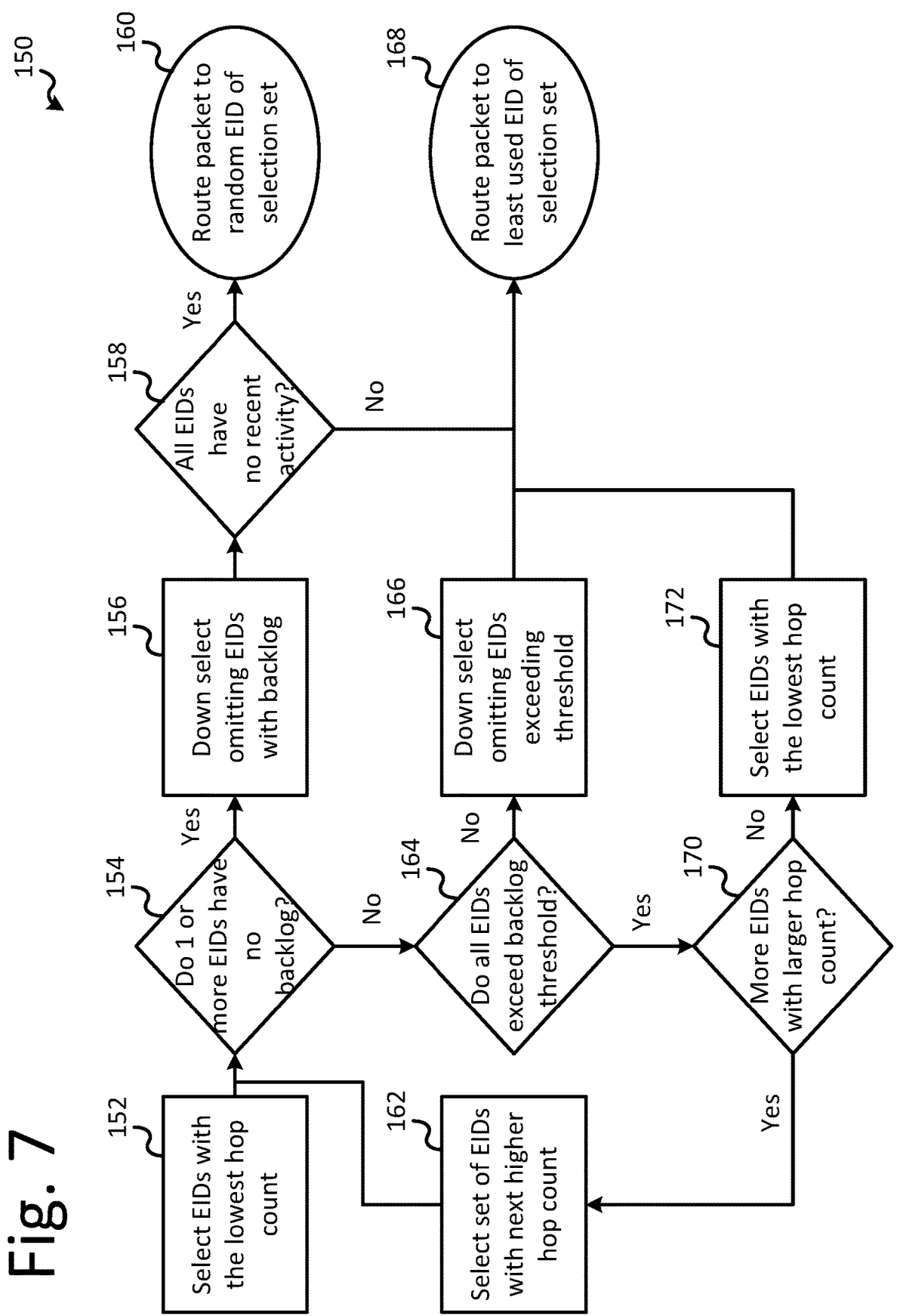
FIG. 7 is a flowchart of another example method in accordance with embodiments of the present disclosure.

FIG. 7 is a flowchart of an example method 150 for route selection in accordance with embodiments of the present disclosure. The method 150 for route selection may be based on egress ID (EID) congestion or bandwidth utilization. The method can include selecting an EID with the lowest hop count 152. An EID may include the local port address of MDSDs operably coupled to a given node.

The method 150 can include determining whether one or more EIDs have no backlog. If one or more EIDs have no backlog the method 150 can proceed to step 156. If there are no EIDs with no backlog the method 150 can proceed to step 164.

The method 150 can include determining whether all EIDs of the selection set have no recent activity 158. The method 150 can proceed to step 160 if all EIDs of the selection set have no recent activity. The method 150 can proceed to step 168 if any HD of the selection set has had recent activity. Recent activity may be within a range of about 1 microsecond to about 100 seconds.

The method 150 can include routing the data packet to a random EID of the selection set 160. The method 150 can include selecting a set of EIDs with a next higher hop count 162. When all EIDs of the current selection set exceed the backlog threshold and there are more EIDs with a higher hop count than the current selection set, an EIDs with a higher hop count may be selected to generate a new selection set.

The method 150 can include determining if all EIDs of the current selection set exceed a backlog threshold 164. The backlog threshold may be a maximum queue depth for data to be transmitted. The backlog threshold may be about 4 kilobytes (4096 bytes) of data to about 1 megabyte (1,048,576 bytes) of data.

The method 150 can include omitting EIDs from the selection set that exceed the backlog threshold 166. Omitting EIDs may include removing such EIDs from the selection set. The method 150 can include routing the data packet to the least used EID of the selection set 168.

The method 150 can include determining if there are more EIDs with a higher hop count 170. If there are more EIDs with a higher hop count the method 150 can proceed to step 162. If there are not more EIDs with a higher hop count the method can proceed to step 172. The method 150 can include selecting EIDs with the lowest hop count 172.

Thus, various embodiments of PORT-TO-PORT NETWORK ROUTING USING A STORAGE DEVICE are disclosed. Although reference is made herein to the accompanying set of drawings that form part of this disclosure, one of at least ordinary skill in the art will appreciate that various adaptations and modifications of the embodiments described herein are within, or do not depart from, the scope and spirit of this disclosure. For example, aspects of the embodiments described herein may be combined in a variety of ways with each other. Therefore, it is to be understood that, within the scope of the appended claims, the claimed invention may be practiced other than as explicitly described herein.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

As used in this specification and the appended claims, the singular forms "a," "an," and "the" encompass embodiments having plural referents, unless the content clearly dictates otherwise. As used in this specification and the appended claims, the term "or" is generally employed in its non-exclusive sense meaning "and/or" unless the content clearly dictates otherwise.

As used herein, "have," "having," "include," "including," "comprise," "comprising" or the like are used in their open ended sense, and generally mean "including, but not limited to". It will be understood that "consisting essentially of," "consisting of," and the like are subsumed in "comprising," and the like.

The phrases "at least one of," "comprises at least one of," and "one or more of" followed by a list refers to any one of the items in the list and any combination of two or more items in the list.

What is claimed is:

1. A multi-port data storage device comprising:
   a first port;
   a second port; and
   a bridge to receive one or more data packets via the first or second ports to be transmitted to a destination external to the multi-port data storage device and to transmit one or more received data packets via the first or second ports based on a destination address of each of the one or more data packets.

2. The multi-port data storage device of claim 1, wherein the bridge is configured to receive one or more data packets via direct memory access.

3. The multi-port data storage device of claim 1, wherein the bridge is configured to transmit the one or more received data packets using direct memory access.

4. The multi-port data storage device of claim 1, wherein the first port is operatively coupled to a data bus the second port is operatively coupled to another data bus.

5. The multi-port data storage device of claim 1, wherein the multi-port data storage device is a solid state drive (SSD).

6. The multi-port data storage device of claim 1, wherein the multi-port data storage device is a non-volatile memory express (NVMe) data storage device.

7. The multi-port data storage device of claim 1, wherein the bridge is configured to decrement a passthru limit of the received one or more data packets.

8. The multi-port data storage device of claim 1, wherein the bridge is configured to transmit the one or more received data packets without using processors or memory of an external device.

9. A method for transmitting data in a multi-port data storage device, the method comprising:
   generating a data packet using a source node of a plurality of nodes;
   transmitting the generated data packet to a multi-port data storage device of a plurality of multi-port data storage devices;
   receiving the transmitted data packet via a first port of the multi-port data storage device using a bridge of the multi-port data storage device; and
   transmitting the received data packet via a second port of the multi-port data storage device using the bridge to one of another multi-port data storage device or to a second node operatively coupled to the multi-port data storage device.

10. The method of claim 9, wherein transmitting the received data packet further comprises transmitting the data packet using direct memory access.

11. The method of claim 9, wherein transmitting the received data packet may further comprise:
    selecting the one of another multi-port data storage device based on egress ID (EID) congestion or bandwidth utilization; and
    transmitting the data packet to the selected one of another multi-port data storage device.

12. The method of claim 9, wherein transmitting the received data packet further comprises transmitting the data packet to one of another multi-port data storage device or to the second node based on a destination address of the data packet.

13. The method of claim 9, wherein transmitting the received data packets to one of another multi-port data storage device or to the second node is based on a destination address of the data packet.

14. The method of claim 9, receiving the transmitted data packet comprises receiving the data packet via direct memory access.

15. The method of claim 9, wherein the multi-port data storage device is a solid state drive (SSD).

16. The method of claim 9, wherein the multi-port data storage device is a non-volatile memory express (NVMe) data storage device.

17. The method of claim 9, further comprising decrementing a passthru limit of the received data packet.

18. The method of claim 9, wherein transmitting the received data packet comprises transmitting the data packet without using processors or memory of the first and second node.

19. A port-to-port network routing system comprising:
a source node comprising a memory and a data bus, the source node configured to:
generate a data packet; and
transmit the data packet;
a multi-port data storage comprising:
a first port;
a second port; and
a bridge configured to:
receive the transmitted data packet via the first port; and
transmit the received data packet via the second port to one of another multi-port data storage device or to a second node operatively coupled to the multi-port data storage device.

20. The port-to-port network routing system of claim 19, wherein the bridge is configured to transmit the data packet to another multi-port data storage device or to the second node based on a destination address of the data packet.

* * * * *